United States Patent
Kang et al.

(10) Patent No.: US 11,488,391 B2
(45) Date of Patent: Nov. 1, 2022

(54) METHOD AND APPARATUS FOR ESTIMATING POSITION

(71) Applicant: Samsung Electronics Co., Ltd., Suwon-si (KR)

(72) Inventors: Chui Woo Kang, Suwon-si (KR); Wonhee Lee, Yongin-si (KR); Hyun Sung Chang, Seoul (KR); Hyun Cheol Jeon, Suwon-si (KR); Kyungboo Jung, Seoul (KR); Hojin Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 17/147,864

(22) Filed: Jan. 13, 2021

(65) Prior Publication Data

US 2022/0058401 A1 Feb. 24, 2022

(30) Foreign Application Priority Data

Aug. 24, 2020 (KR) .................. 10-2020-0106524

(51) Int. Cl.
*G06V 20/56* (2022.01)
*G06T 7/70* (2017.01)
(Continued)

(52) U.S. Cl.
CPC .............. *G06V 20/56* (2022.01); *G06T 7/70* (2017.01); *G06V 10/25* (2022.01); *G06V 10/454* (2022.01);
(Continued)

(58) Field of Classification Search
CPC ...... G06V 20/56; G06V 10/25; G06V 10/454; G06V 10/82; G06T 7/70;
(Continued)

(56) References Cited

U.S. PATENT DOCUMENTS 9,026,303 B1 * 5/2015 Ferguson ................ G05D 1/00
701/28
9,268,330 B2    2/2016 Brot et al.
(Continued)

FOREIGN PATENT DOCUMENTS

KR          10-1105606 B1      1/2012
KR      10-2013-0054637 A      5/2013
(Continued)

OTHER PUBLICATIONS

Machine translation for WO 2021/250848 (Year: 2020).*
(Continued)

*Primary Examiner* — Qian Yang
(74) *Attorney, Agent, or Firm* — NSIP Law

(57) ABSTRACT

A position information estimating method and apparatus are provided, wherein the position information estimating method includes estimating initial position information of a vehicle based on motion information of the vehicle that is obtained from one or more sensors, calculating search position information of one or more objects included in an image of surroundings of the vehicle based on the initial position information, evaluating a final reliability of each of the one or more objects based on the initial position information and the search position information, obtaining a filter adaptation parameter corresponding to a weight of the search position information based on the final reliability, and estimating final position information of the vehicle based on the initial position information, the search position information, and the filter adaptation parameter.

22 Claims, 6 Drawing Sheets

(51) Int. Cl.
*G06V 10/25* (2022.01)
*G06V 10/44* (2022.01)

(52) U.S. Cl.
CPC .............. *G06T 2207/20084* (2013.01); *G06T 2207/30252* (2013.01)

(58) Field of Classification Search
CPC . G06T 2207/20084; G06T 2207/30252; G06T 7/73; G06T 2207/20081; G06T 7/246; G06T 7/277; G06T 2207/10016; G06T 2207/20076; B60W 40/02; B60W 40/10; B60W 2050/0005; B60W 2050/0052; B60W 2420/00; B60W 2422/95; B60W 2552/50; G06N 3/08; B60Y 2400/30
See application file for complete search history.

(56) References Cited

U.S. PATENT DOCUMENTS

| | | | |
|---|---|---|---|
| 9,684,836 B1 * | 6/2017 | Ferguson | G06T 7/74 |
| 9,883,590 B2 * | 1/2018 | Huang | H05K 1/0218 |
| 10,054,445 B2 | 8/2018 | Ma | |
| 10,592,784 B2 | 3/2020 | Zeng et al. | |
| 10,816,654 B2 * | 10/2020 | Rohani | G01S 13/865 |
| 2015/0148997 A1 | 5/2015 | Brot et al. | |
| 2017/0328716 A1 | 11/2017 | Ma | |
| 2019/0042865 A1 * | 2/2019 | Vallespi-Gonzalez | G06T 7/521 |
| 2019/0258894 A1 | 8/2019 | Zeng et al. | |
| 2019/0286153 A1 * | 9/2019 | Rankawat | G06T 7/11 |
| 2020/0158887 A1 * | 5/2020 | Lee | G01S 19/485 |
| 2020/0293064 A1 * | 9/2020 | Wu | G06V 20/597 |

FOREIGN PATENT DOCUMENTS

| | | |
|---|---|---|
| KR | 10-2014-0072763 A | 6/2014 |
| KR | 10-2015-0033304 A | 4/2015 |
| KR | 10-2017-0025334 A | 3/2017 |
| KR | 10-1873202 B1 | 7/2018 |
| KR | 10-1879855 B1 | 7/2018 |
| KR | 10-1899549 B1 | 9/2018 |
| KR | 10-2019-0016332 A | 2/2019 |
| KR | 10-2019-0087338 A | 7/2019 |
| KR | 10-2019-0131207 A | 11/2019 |
| KR | 10-2021-0073281 A | 6/2021 |
| WO | WO 2021/250848 * | 6/2020 |

OTHER PUBLICATIONS

Jazayeri et al., "Vehicle Detection and Tracking in Car Video Based on Motion Model", IEEE Transactions on Intelligent Transportation Systems, vol. 12, No. 2, Jun. 2011 (Year: 2011).*

Hu et al., "Traffic Accident Prediction Using 3-D Model-Based Vehicle Tracking", IEEE Transactions on Vehicular Technology, vol. 53, No. 3, May 2004 (Year: 2004).*

* cited by examiner

METHOD AND APPARATUS FOR ESTIMATING POSITION

CROSS-REFERENCE TO RELATED APPLICATIONS

This application claims the benefit under 35 USC § 119(a) of Korean Patent Application No. 10-2020-0106524 filed on Aug. 24, 2020, in the Korean Intellectual Property Office, the entire disclosure of which is incorporated herein by reference for all purposes.

BACKGROUND

Field

The following description relates to estimating a position of a vehicle using an image sensor and a non-image sensor.

Description of Related Art

A vehicle navigation system may verify a current position and a velocity of a moving object by receiving a radio wave from a satellite of global positioning systems (GPS), while a vehicle is traveling. The vehicle navigation system may calculate three-dimensional (3D) position information of the vehicle that includes latitude, longitude, and elevation information using information received by a GPS receiver. However, a GPS signal may include a GPS position error that ranges from approximately 10 meters (m) to 100 m. Such a position error may be corrected using various sensor signals of various sensors including an image sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a position information estimating method to be performed by a processor, including estimating initial position information of a vehicle based on motion information of the vehicle that is obtained from one or more sensors, calculating search position information of one or more objects included in an image of surroundings of the vehicle based on the initial position information, evaluating a final reliability of each of the one or more objects based on the initial position information and the search position information, obtaining a filter adaptation parameter corresponding to a weight of the search position information based on the final reliability, and estimating final position information of the vehicle based on the initial position information, the search position information, and the filter adaptation parameter.

The evaluating of the final reliability may include evaluating an initial reliability of each of the one or more objects included in frame images of a current frame block of the image of the surroundings of the vehicle, and evaluating the final reliability based on the initial reliability corresponding to the current frame block and an initial reliability corresponding to a previous frame block.

The evaluating of the final reliability may include outputting a feature vector corresponding to the initial reliability of each of the one or more objects included in the current frame block, using a preprocessor, and outputting a classification vector indicating the final reliability of each of the one or more objects based on the feature vector corresponding to the current frame block and a feature vector corresponding to the previous frame block, using a state classifier.

The evaluating of the final reliability further may include classifying state information of the search position information of each of the one or more objects based on the classification vector of each of the objects.

The preprocessor may include a convolutional neural network (CNN), and the state classifier may include a recurrent neural network (RNN) or a long short-term memory (LSTM) model.

The position information estimating may include excluding an object of the one or more objects having the initial reliability less than a first threshold value or an object of the one or more objects having the final reliability less than a second threshold value.

The obtaining of the filter adaptation parameter may include determining a filter adaptation parameter based on the final reliability.

The obtaining of the filter adaptation parameter may include determining a filter adaptation parameter based on state information of the search position information of each of the objects.

The obtaining of the filter adaptation parameter may include outputting the filter adaptation parameter based on the final reliability, using a parameter determining network, wherein the parameter determining network may be trained in advance based on a training image including one or more objects and on ground truth position information.

The obtaining of the filter adaptation parameter may include outputting the filter adaptation parameter by inputting, to the parameter determining network, a classification vector indicating the final reliability of each of the one or more objects.

The estimating of the final position information may include estimating the final position information based on the initial position information, the search position information, and the filter adaptation parameter, using a Kalman filter.

The calculating of the search position information of the one or more objects may include using a pre-trained neural network for each object type to output the search position information of the one or more objects.

The filter adaptation parameter may be configured to adjust a covariance matrix of the Kalman filter.

The initial position information of the vehicle may include one or more of a position, a velocity, and a pose of the vehicle.

In another general aspect, there is provided a position information estimating apparatus, including a memory configured to store an image of surroundings of a vehicle, and a processor configured to estimate initial position information of the vehicle based on motion information obtained from one or more sensors, calculate search position information of one or more objects included in the image of the surroundings of the vehicle based on the initial position information, evaluate a final reliability of each of the one or more objects based on the initial position information and the search position information, obtain a filter adaptation parameter corresponding to a weight of the search position information based on the final reliability, and estimate final position information of the vehicle based on the initial position information, the search position information, and the filter adaptation parameter.

The processor may be configured to output a feature vector corresponding to an initial reliability of each of the one or more objects included in frame images of a current frame block of the image of the surroundings of the vehicle, using a preprocessor, and output a classification vector indicating the final reliability of each of the one or more objects based on the feature vector corresponding to the current frame block and a feature vector corresponding to a previous frame block, using a state classifier.

The processor may be configured to classify state information of the search position information of each of the one or more objects based on the classification vector of each of the objects.

The processor may be configured to determine a filter adaptation parameter based on state information of the search position information of each of the objects.

The processor may be configured to output the filter adaptation parameter by inputting, to a parameter determining network, a classification vector indicating the final reliability of each of the objects, wherein the parameter determining network is trained in advance based on a training image including one or more objects and on ground truth position information.

The processor may be configured to estimate the final position information based on the initial position information, the search position information, and the filter adaptation parameter, using a Kalman filter.

In another general aspect, there is provided a vehicle including a sensor configured to output sensed motion information of the vehicle, a memory configured to store an image of surroundings of the vehicle, and a processor configured to estimate initial position information of the vehicle based on the sensed motion information, calculate search position information of one or more objects included in the image of the surroundings of the vehicle based on the initial position information, evaluate a final reliability of each of the one or more objects based on the initial position information and the search position information, obtain a filter adaptation parameter corresponding to a weight of the search position information based on the final reliability, and estimate final position information of the vehicle based on the initial position information, the search position information, and the filter adaptation parameter.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
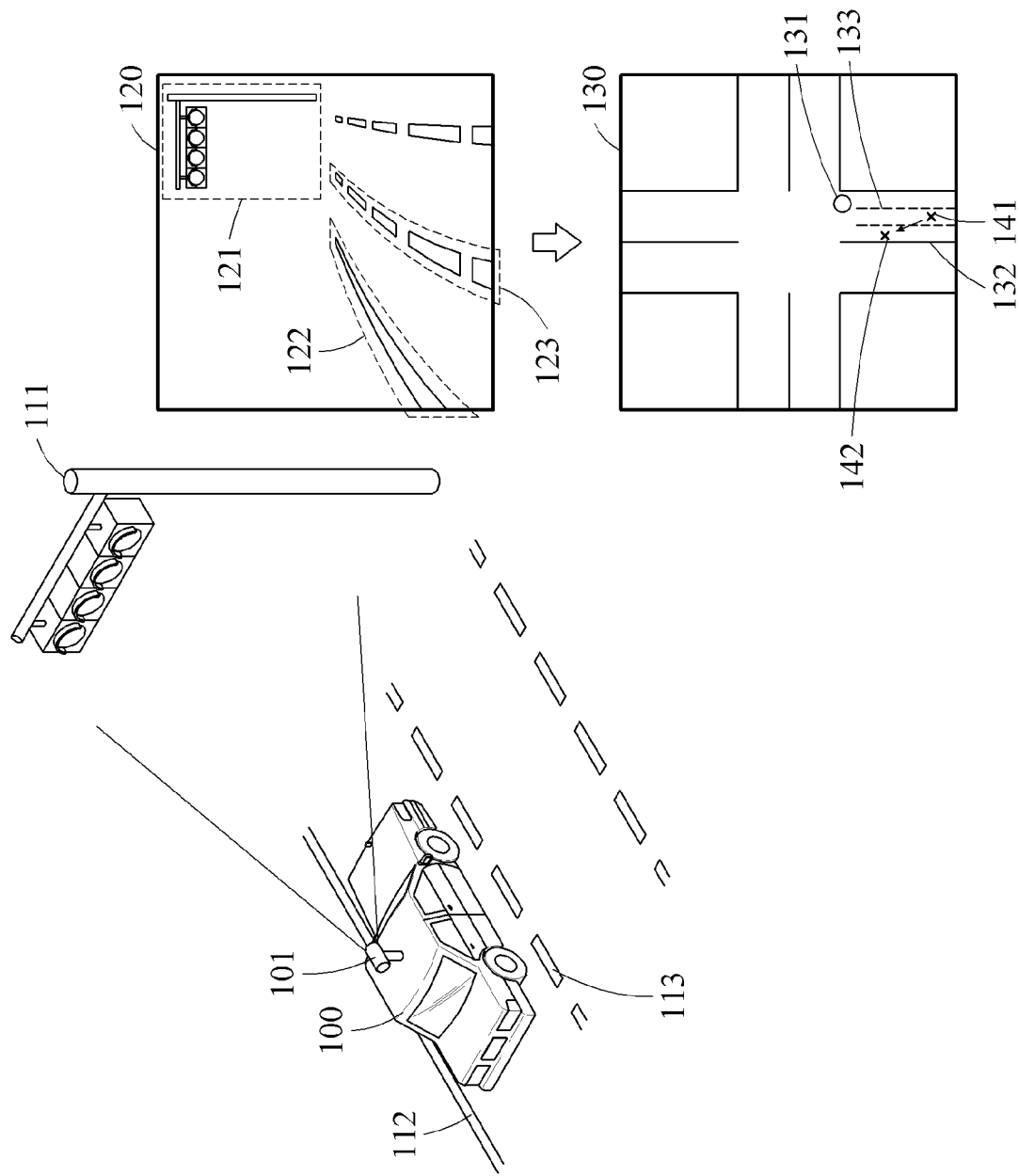
FIG. 1 illustrates an example of a situation in which a position information estimating apparatus estimates a position of a vehicle.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a situation in which a position information estimating apparatus estimates a position of a vehicle.

In an example, a position information estimating apparatus may estimate a position of a vehicle using an image sensor and a non-image sensor. The position information estimating apparatus may estimate final position information of the vehicle using sensed motion information of the vehicle that is estimated from the non-image sensor and search position information obtained from the image sensor. The sensed motion information refers to position information of the vehicle that is estimated from the non-image sensor. The search position information refers to position information of the vehicle that is calculated through image processing of the image sensor.

The image sensor may include a camera configured to capture an image of surroundings of a vehicle. The non-image sensor may include an inertial measurement unit (IMU) configured to measure an angular velocity and an acceleration, a global positioning system (GPS) configured to measure a position, a velocity, and a pose, and a vehicle speedometer or odometer. The vehicle odometer may include an on-board diagnostics (OBD) sensor. The non-image sensor may further include a radio detection and ranging (radar) sensor or a light detection and ranging (lidar) sensor. In an example, the radar sensor and the lidar sensor may also be the image sensor because they may have a spatial resolution.

To fuse information obtained from the image sensor and information obtained from the non-image sensor, setting a weight of each of the information may be needed. For a general Kalman filter, an optimal weight may be calculated by assuming measured sensor values or sensor measurements by a Gaussian distribution, and the information may be fused using the calculated optimal weight. In general, noise of the non-image sensor may be assumed by a Gaussian probability distribution. However, noise included in an algorithm of searching for an object from an image captured by the image sensor and calculating a position of a vehicle based on a result of the searching may have an atypical characteristic, and may not follow the Gaussian probability distribution. For example, objects may be searched independently. Thus, a significant object may not be searched from an image, positions of independently searched objects may be incorrectly determined, or a searched object and an object on a map may be mismatched. Such an incorrectly calculated position may be an outlier deviating from the Gaussian probability distribution. Thus, in a case in which objects of which positions are incorrectly calculated as described in the foregoing are fused with the optimal weight in the general Kalman filter, a great error may occur in a position estimation result. Thus, evaluating a reliability of the search position information and setting a weight based on a result of the evaluating may be needed.

In an example, the position information estimating apparatus may fuse information obtained from an image sensor and information obtained from a non-image sensor, thereby estimating accurate and stable final position information. The position information estimating apparatus may evaluate a reliability of the information obtained from the image sensor, determine a weight based on the evaluated reliability, and use the determined weight to estimate the final position information.

For this, the position information estimating apparatus may estimate initial position information based on sensed motion information obtained from the non-image sensor. The position information estimating apparatus may search for an object from an image captured by the image sensor and calculate search position information based on the initial position information. The position information estimating apparatus may evaluate a reliability of the search position information of the object searched from the image, using the initial position information or the sensed motion information. The position information estimating apparatus may determine a weight of the search position information to be applied to a modified Kalman filter based on the evaluated reliability. The modified Kalman filter may include a multi-modal Kalman filter, for example. The multi-modal Kalman filter refers to a model to which a weight of information obtained from an image is applied. The weight of the search position information to be applied to the modified Kalman filter is also referred to herein as a filter adaptation parameter. The position information estimating apparatus may estimate the final position information based on the initial position information and the search position information, using the modified Kalman filter based on the determined filter adaptation parameter. The position information estimating apparatus may fuse the image sensor and the non-image sensor as described above, thereby achieving stability while improving the performance of estimating position information.

An object described herein refers to an object included in a captured image and indicates an object fixed at an arbitrary geographical position that is used to provide a driver with information needed for navigation and driving of a vehicle on a road. That is, the object may be feature information used to estimate a position of the vehicle. The feature information may include a landmark, a lane mark, a lane number. The object may include, for example, a road sign and a traffic light. For example, the landmark may be classified into a warning sign, a regulation sign, an indicating sign, an assistance sign, a road marking, a signal, and the like. Although the feature information is described above as including a landmark, a lane mark, and a lane number, examples of which are not limited thereto. For example, the feature information may include any information that helps to determine motion information of a vehicle in an image.

When each feature information is detected independently, certain feature information may not be detected in an image, or erroneous or incorrect feature information may be detected. In another example, although the detection is performed accurately, erroneous or incorrect information may be generated in a process of matching with map information. The position information estimating apparatus may select a mode based on a reliability or accuracy with respect to each information, thereby increasing robustness against such errors that may occur in a process of image processing.

For example, the position information estimating apparatus may estimate a position of a vehicle by fusing information obtained from an IMU configured to measure an angular velocity and an acceleration, a GPS configured to measure a position, a camera configured to capture an image of surroundings, and a vehicle speedometer or odometer. The position information estimating apparatus may input sensed motion information or initial position information obtained from the IMU and the GPS to a neural network of a convolutional neural network (CNN)-recurrent neural network (RNN) architecture, and evaluate a reliability of an object retrieved by searching through the camera or a reliability of search position information calculated from the object. The position information estimating apparatus may estimate the initial position information of the vehicle using the IMU and the GPS, and search for an object from an image of the surroundings captured using the camera based on the estimated initial position information. The position information estimating apparatus may calculate the search position information indicating a position of the object retrieved through the searching. The position information estimating apparatus may evaluate the reliability of the object through the neural network based on the initial position information and information associated with the retrieved object. The position information estimating apparatus may perform a first reliability evaluation on a plurality of images in a time block or search position information calculated from the images in the time block, using a deep neural network (DNN)-type preprocessor. The position information estimating apparatus may perform a second reliability evaluation for a relatively long period of time using an RNN-type or long short-term memory (LSTM)-type state classifier that uses a result of the preprocessor as an input. The position information estimating apparatus may determine a filter adaptation parameter using the reliability. The position information estimating apparatus may estimate final position information by fusing the information of the object and information of non-image sensors based on the filter adaptation parameter, using a Kalman filter.

The position information estimating apparatus may estimate current initial position information based on previous position information or pose information using the IMU, the GPS, or the odometer. The position information estimating apparatus may extract objects from a map based on the initial position information, and transform a position of each of the extracted objects into a coordinate system of the camera. The position information estimating apparatus may search for the objects in an image captured by the camera based on estimated positions of the objects obtained through the transforming. The position information estimating apparatus may correct a position of the vehicle by calculating a difference between the initial position information and search position information of the objects retrieved through the searching.

As described above, the position information estimating apparatus may estimate the current initial position information using the IMU, the GPS, or the odometer, and search for an object through the camera using the estimated initial position information. The position information estimating apparatus may search for the object included in the image captured by the camera. For example, the position information estimating apparatus may use a traditional image processing method or a deep learning method. Each object may be assumed as a separate sensor signal, and be considered an independent measured value in a Kalman filter.

The position information estimating apparatus may perform a reliability evaluation on search position information of each object through a reliability evaluator. The reliability evaluator may also be referred to as a DNN image classifier. In an example, the reliability evaluator may include a neural network including a preprocessor and a state classifier. The preprocessor may include a CNN-type neural network, and the state classifier may include an RNN-type or LSTM-type neural network.

The position information estimating apparatus may determine a filter adaptation parameter to be applied to a multi-modal Kalman filter through a filter adapter. The position information estimating apparatus may perform filter adaptation using a reliability output from the reliability evaluator. In an example, the position information estimating apparatus may exclude objects in an abnormal state from the multi-modal Kalman filter. In another example, the position information estimating apparatus may adjust a covariance matrix of the multi-modal Kalman filter in response to the reliability. By setting a large measurement covariance for an object corresponding to an abnormal measured value, a same result as the measured value being disregarded may be obtained.

The adjusting of the covariance matrix of the multi-modal Kalman filter may be performed in two ways when determining the filter adaptation parameter. However, the covariance matrix may also be adjusted in other ways. In an example, the position information estimating apparatus may determine a filter adaptation parameter to be applied to the multi-modal Kalman filter from a preset filter adaptation parameter based on state information. For example, the filter adaptation parameter may be 0 when the state information indicates normal, and the filter adaptation parameter may be 3 when the state information indicates degraded performance. In addition, the filter adaptation parameter may be 100 when the state information indicates abnormal. In another example, the position information estimating apparatus may determine a filter adaptation parameter associated with a reliability using a neural network trained in advance through supervised learning.

The position information estimating apparatus may be associated with a precise positioning algorithm applicable to a navigation system or device for a vehicle and an aircraft, and may be applied directly to a vehicle control system, for example, an advanced driver assistance system (ADAS) and an autonomous driving system, in addition to an existing vehicle positioning system or device. In addition, the position information estimating apparatus may be applied to a sensor system or positioning system, an augmented reality (AR) device, and the like that calculate a position and a pose by fusing heterogeneous sensors such as a camera and an inertial sensor.

Referring to FIG. 1, a vehicle 100 includes an image sensor 101 and a non-image sensor. The non-image sensor may include a GPS, an IMU, and a vehicle speedometer or odometer, for example. A position information estimating apparatus provided in the vehicle 100 may calculate sensed motion information of the vehicle 100 based on sensed or sensor information of each of the GPS, the IMU, and the vehicle odometer. By the non-image sensor, a position of the vehicle 100 may be estimated to be a position 141 on a map 130.

The image sensor 101 captures an image 120 of a front side of the vehicle 100. The captured image 120 includes a traffic light 121, a lane mark 122, and a lane mark 123. The position information estimating apparatus detects the traffic light 121 from the image 120 using a neural network configured to detect a landmark. The position information estimating apparatus detects the lane mark 122 and the lane mark 123 from the image 120 using a neural network configured to detect a lane mark.

The position information estimating apparatus estimates a position of each of a traffic light 111, a lane mark 112, and a lane mark 113 based on initial position information and map information. In the illustrated example, in a current frame block, a difference between a position of the traffic light 111 and a position of the traffic light 121 may be greater than a threshold value, a difference between a position of the lane mark 112 and a position of the lane mark 122 may be less than threshold value, and a difference between a position of the lane mark 113 and a position of the lane mark 123 may be less than the threshold value. In this example, a relatively low reliability may be obtained for a position 131 of the traffic light 111. The position information estimating apparatus may then exclude search position information of the traffic light 121 in the current frame block from a result of a preprocessor, or set a corresponding weight to be low. In the example, the position information estimating apparatus may evaluate a reliability of a position 132 of the lane mark 112 and a reliability of a position 133 of the lane mark 113 to be high.

For example, although the difference between the position of the traffic light 111 and the position of the traffic light 121 in the current frame block is less than the threshold value, the difference in a previous frame block may be greater than the threshold value. In this example, a relatively low reliability may be obtained for the position 131 of the traffic light 111. In this case, the position information estimating apparatus may exclude the search position information of the traffic light 121 from a result of a state classifier, or set a corresponding weight to be low.

The position information estimating apparatus may determine a filter adaptation parameter to be applied to a multi-modal Kalman filter based on the reliability of the position 131 of the traffic light 111. The position information estimating apparatus may determine the filter adaptation parameter based on each of the reliability of the position 131 of the traffic light 111, the reliability of the position 132, and the reliability of the position 133, using a preset value or a pre-trained neural network.

The position information estimating apparatus may estimate final position information of the vehicle 100 based on the position 141 which is the initial position information, and on the position 131 and the filter adaptation parameter for the position 131, the position 132 and the filter adaptation parameter for the position 132, and the position 133 and the filter adaptation parameter for the position 133, using the multi-modal Kalman filter. The position information estimating apparatus may correct the position 141 of the vehicle 100 on the map 130 to be a position 142.

A Kalman filter used by the position information estimating apparatus may be a state estimation algorithm operating recursively, which undergoes a time update process in which a previous state is propagated as time passes and a measurement update process in which a new measured value is fused when it is input. The Kalman filter may include a general linear Kalman filter, and a nonlinear filtering algorithm such as an extended Kalman filter using a nonlinear equation.

For the Kalman filter, a matrix operation may be available for a linear system in which a state at a time has a linear relationship with a state at a previous time. Noise may include white noise that follows a Gaussian probability distribution. The Gaussian probability distribution may be accurately modeled with a mean and a covariance.

$$x_k = Ax_{k-1} + w_k \qquad \text{[Equation 1]}$$

$$z_k = Hx_k + v_k \qquad \text{[Equation 2]}$$

The linear system may be represented by Equations 1 and 2 above. Equation 1 is a state equation representing a signal waveform of the system and referred to as a process model. Equation 2 is an output equation representing measurable values among system signals and referred to as a measurement model.

In Equations 1 and 2 above, A denotes a state transition matrix based on a previous state. H denotes a matrix indicating a relationship between a state and a measured value. w denotes process noise, and v denotes measurement noise. k denotes a kth time index, and k−1 denotes a k−1th time index. An initial state and each noise are assumed as being independent of each other.

$$\hat{x}_k^- = A\hat{x}_{k-1} + Bu_k \qquad \text{[Equation 3]}$$

$$P_k^- = AP_{k-1}A^T + Q \qquad \text{[Equation 4]}$$

$$K_k = P_k^- H^T (HP_k^- H^T + R)^{-1} \qquad \text{[Equation 5]}$$

$$\hat{x}_k = \hat{x}_k^- + K_k(z_k - H\hat{x}_k^-) \qquad \text{[Equation 6]}$$

$$P_k = (I - K_k H)P_k^- \qquad \text{[Equation 7]}$$

Equations 3 and 4 are state equations corresponding to the time update process of estimating current state information based on previous state information. Equations 5, 6, and 7 correspond to the measurement update process of correcting state information using the measurement model. x denotes state information. P denotes an error covariance matrix. Q denotes a covariance matrix of system noise Buk or a covariance matrix of w in Equation 1. R denotes a covariance matrix of measurement noise zk, which is a constant value. ˆ indicates being estimated, and ⁻ indicates a priori estimate before being corrected to a measured value at a current time.

$$R = E[v_k v_k^T] \qquad \text{[Equation 8]}$$

$$\overline{R} = E[(v_k + d_k)(v_k + d_k)^T] \qquad \text{[Equation 9]}$$

$$\overline{R} = E[d_k d_k^T] \qquad \text{[Equation 10]}$$

$$\overline{R} = R + D = R + \alpha R = (1 + \alpha)R \qquad \text{[Equation 11]}$$

R may be calculated based on Equation 8 above. In Equation 8, E denotes an expected value, and v denotes measurement nose in Equation 2. Although v follows the Gaussian probability distribution, measurement noise by a camera may not follow the Gaussian probability distribution. Thus, by adding measurement noise d by a camera and applying v+d, in lieu of v, to Equation 8, Equation 9 may be obtained. Under the assumption that there is no correlation between v and d, Equation 10 may be obtained. By defining a second term of Equation 10 as D and assuming D as a multiple of the constant value R, Equation 11 may be obtained. In Equation 11, a denotes a filter adaptation parameter.

Figure 2:
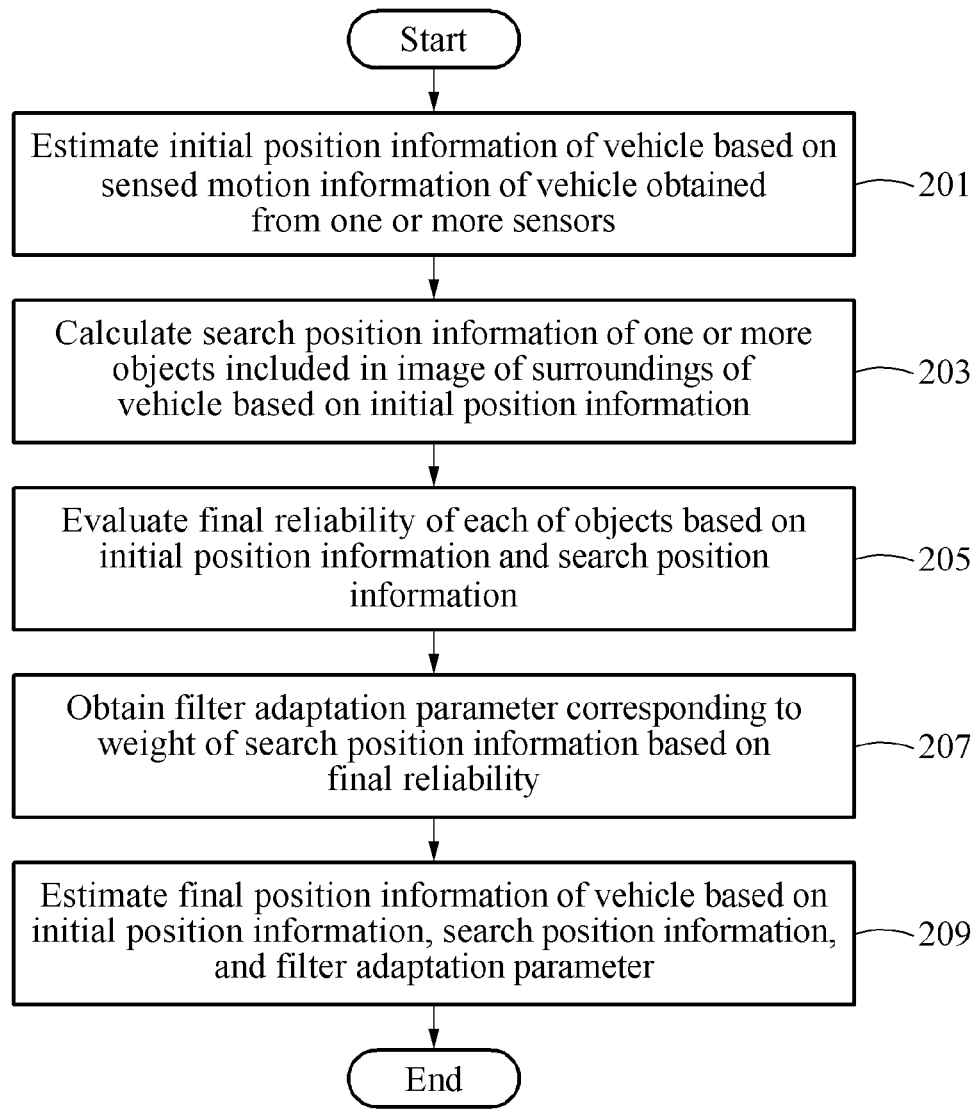
FIG. 2 illustrates a diagram illustrating an example of a position information estimating method.

FIG. 2 illustrates a diagram illustrating an example of a position information estimating method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, a position information estimating apparatus estimates initial position information of a vehicle based on one or more sets of sensed motion information of the vehicle that are obtained from one or more sensors. For example, the sensed motion information may include information obtained from measured sensor values of heterogeneous sensors such as, for example, an IMU and a GPS.

In operation 203, the position information estimating apparatus calculates search position information of one or more objects included in a captured image of surroundings of the vehicle based on the initial position information.

In operation 205, the position information estimating apparatus evaluates a final reliability of each of the objects based on the initial position information and the search position information. The position information estimating apparatus may evaluate an initial reliability of each of the objects included in a plurality of frame images included in a current frame block of the image of the surroundings of the vehicle. The position information estimating apparatus may evaluate the final reliability based on the initial reliability corresponding to the current frame block and an initial reliability corresponding to a previous frame block.

The position information estimating apparatus may use a preprocessor to output a feature vector indicating the initial reliability of each of the objects included in the frame images included in the current frame block of the image of the surroundings of the vehicle. The position information estimating apparatus may use a state classifier to output a classification vector indicating the final reliability of each of the objects based on the feature vector corresponding to the current frame block and a feature vector corresponding to the previous frame block. The position information estimating apparatus may classify state information of the search position information of each of the objects based on the classification vector for each of the objects. The preprocessor may include a CNN, and the state classifier may include an RNN or an LSTM model. The position information estimating apparatus may exclude an object of which an initial reliability is less than a first threshold value or an object of which a final reliability is less than a second threshold value.

In operation 207, the position information estimating apparatus obtains a filter adaptation parameter corresponding to a weight of the search position information based on the final reliability. In an example, the position information estimating apparatus may determine a filter adaptation parameter based on the final reliability. The position information estimating apparatus may determine the filter adaptation parameter based on the state information of the search position information of each of the objects. In another example, the position information estimating apparatus may output the filter adaptation parameter based on the final reliability, using a parameter determining network. The parameter determining network may be trained in advance based on a training image including one or more objects and on ground truth position information (or simply referred to herein as true position information). The position information estimating apparatus may output the filter adaptation parameter by inputting, to the parameter determining network, the classification vector indicating the final reliability of each of the objects.

In operation 209, the position information estimating apparatus estimates final position information of the vehicle based on the initial position information, the search position information, and the filter adaptation parameter. The position information estimating apparatus may use a Kalman filter to estimate the final position information based on the initial position information, the search position information, and the filter adaptation parameter.

Figure 3:
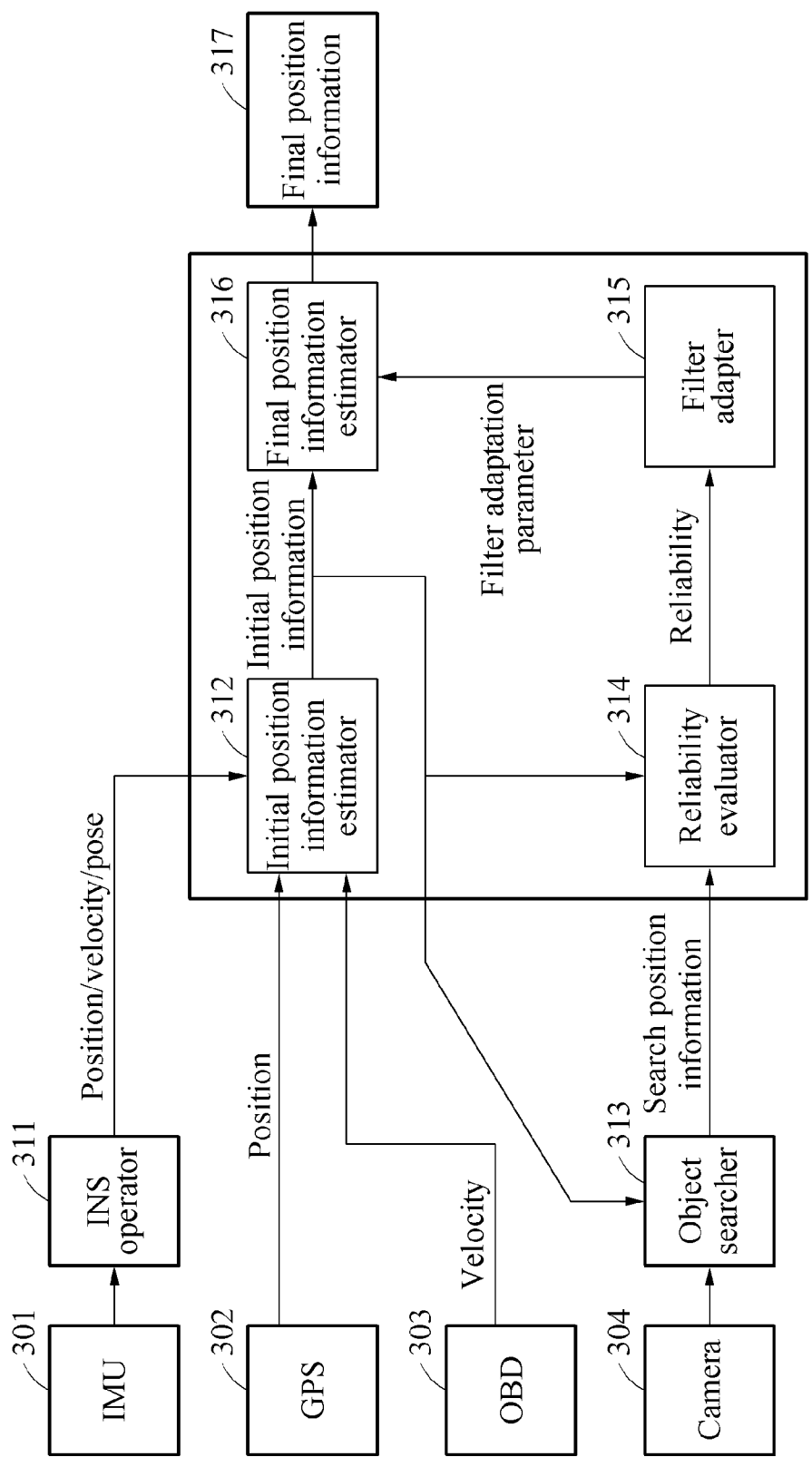
FIG. 3 illustrates an example of a framework of an algorithm of a position information estimating method.

FIG. 3 illustrates an example of a framework of an algorithm of a position information estimating method.

Referring to FIG. 3, a position information estimating apparatus includes an initial position information estimator 312, a final position information estimator 316, a reliability evaluator 314, and a filter adapter 315.

Sensor information or sensed information of an IMU 301 may include information associated with an angular velocity and an acceleration. An Inertial Navigation System (INS) operator 311 may calculate a position, a velocity, and a pose of a vehicle based on the sensor information of the IMU 301. For example, the INS operator 311 may calculate the position, the velocity, and the position of the vehicle by performing an integral calculus on the angular velocity and the acceleration. Sensor information or sensed information of a GPS 302 may include position information of the vehicle. Sensor information or sensed information of a vehicle odometer 303 (e.g., OBD) may include velocity information of the vehicle.

The initial position information estimator 312 may estimate initial position information based on sensed motion information obtained from the IMU 301, the GPS 302, and the vehicle odometer 303.

An object searcher 313 may search for a plurality of objects from an image captured by a camera 304. For example, the object searcher 313 may detect a landmark, a lane mark, or a lane number from the captured image. The object searcher 313 may include a pre-trained neural network for each object type. The object searcher 313 may output search position information indicating a position of each of the objects retrieved through the searching.

The reliability evaluator 314 may perform a reliability evaluation on the search position information of each of the objects. The reliability evaluator 314 may include a neural network including a preprocessor and a state classifier. The preprocessor may include a CNN-type neural network, and the state classifier may include an RNN-type or LSTM-type neural network.

The filter adapter 315 may determine a filter adaptation parameter to be applied to a multi-modal Kalman filter. The position information estimating apparatus may perform filter adaptation using a reliability output from the reliability evaluator 314.

The final position information estimator 316 may estimate final position information 317 based on the initial position information and the search position information using a Kalman filter modified based on the determined filter adaptation parameter.

Figure 4:
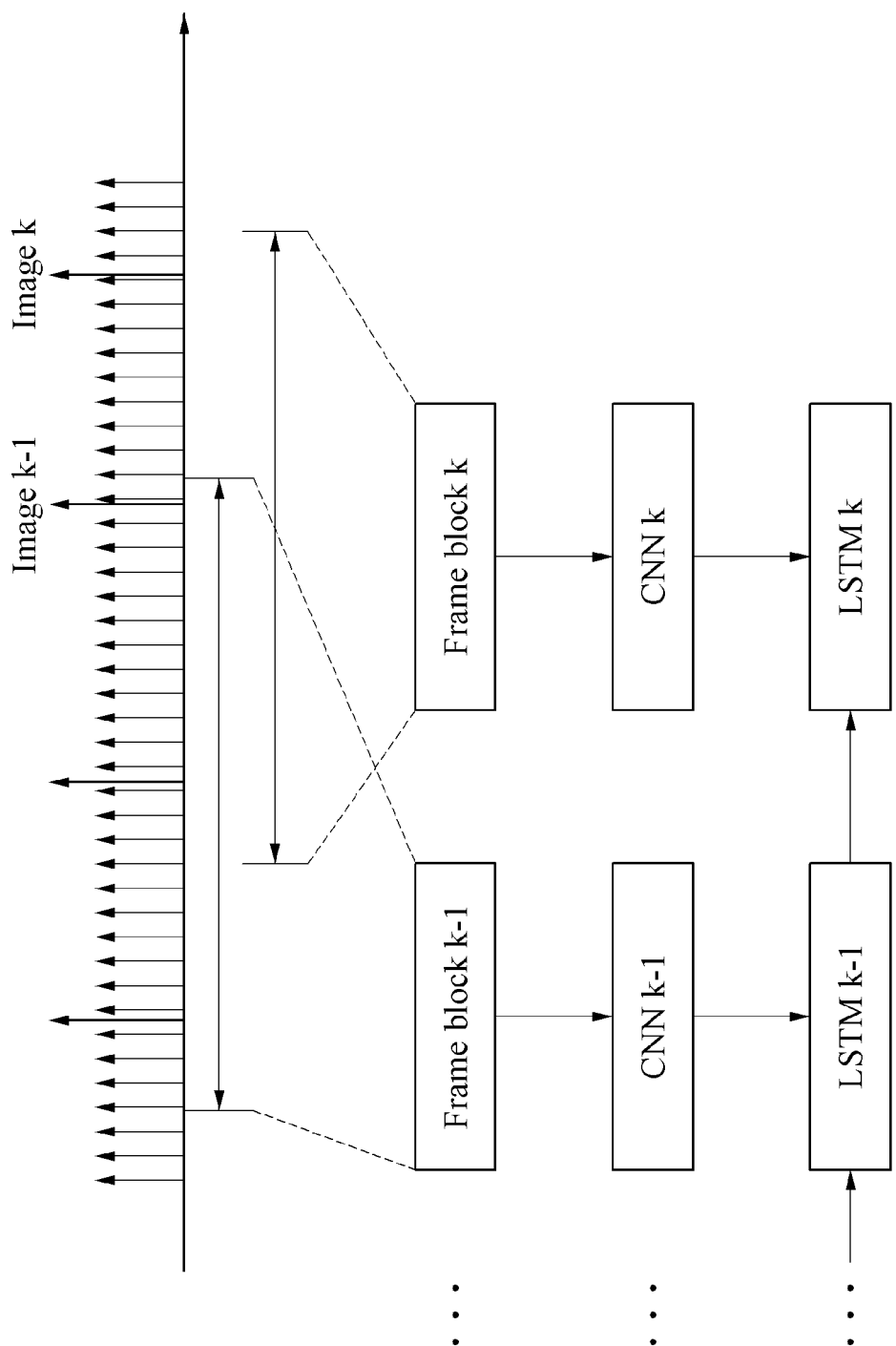
FIG. 4 illustrates an example of an operation of a reliability evaluator illustrated in FIG. 3.

FIG. 4 illustrates an example of an operation of a reliability evaluator illustrated in FIG. 3.

Referring to FIG. 4, initial position information may be estimated based on a short period with respect to a time axis proceeding from left to right. An image acquirement period in which an image is obtained may be greater than an initial position information estimation period in which initial position information is estimated. In the example of FIG. 4, an image k indicates an image obtained from a frame k, and an image k−1 indicates an image obtained from a frame k−1.

A frame block refers to a unit that distinguishes a plurality of frames in a certain period of time. A plurality of sets of initial position information corresponding to a plurality of frames during a previous frame block may be input to a preprocessor, and the image k−1 captured during the previous frame block may be input to the preprocessor. A CNN k−1 indicates that the image k−1 is input to a CNN-type preprocessor. Similarly, a plurality of sets of initial position information corresponding to a plurality of frames during a current frame block may be input to the preprocessor, and the image k captured during the current time block may be input to the preprocessor. A CNN k indicates that the image k is input to the CNN-type preprocessor. In another example, search position information of an object detected from an image may be input in lieu of the image. Frame blocks may overlap each other or not overlap each other.

The preprocessor may detect an abnormal signal from input information for a short period of time which is a single frame block. The abnormal signal may indicate an instantaneous signal change or an outlier. The preprocessor may detect a failure for each of the frame blocks independently.

An output of the preprocessor may be input to a state classifier. The state classifier may include an RNN-type or LSTM-type neural network, and detect an abnormal signal that may gradually occur by aggregating input information for a long period of time. The state classifier may detect an abnormal signal from input information during a plurality of frame blocks. An LSTM k−1 indicates that the image k−1 is input to an LSTM via the CNN-type preprocessor. An LSTM k indicates that the image k is input to the LSTM via the CNN-type preprocessor.

A position information estimating apparatus may train in advance a neural network including the preprocessor and the state classifier using training data. The neural network may be trained with a binary classification such that search position information is accurately derived using the training data in which ground truth is indicated through pre-labeling.

Such a pre-trained neural network may output state information of search position information of each object. The state information indicates whether the search position information is normal. The neural network may also output a reliability which is not the state information. The neural network may output a vector indicating the reliability as an output of the state classifier.

As described above, the position information estimating apparatus may obtain a result robust against an error in a process of image processing by performing second-step failure detection or reliability evaluation.

The position information estimating apparatus may use only an object in a normal state for a modified Kalman filter based on the output of the state classifier or the state information, excluding an abnormal object. Through this, the position information estimating apparatus may estimate final position information that is highly accurate and stable.

Figure 5:
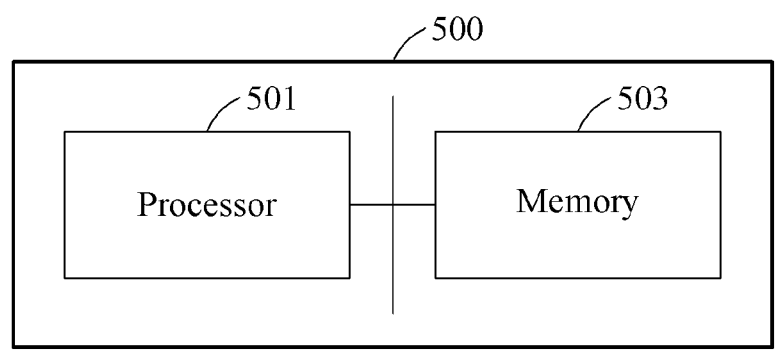
FIG. 5 illustrates an example of a position information estimating apparatus.

FIG. 5 illustrates an example of a position information estimating apparatus.

Referring to FIG. 5, a position information estimating apparatus 500 includes at least one processor 501 and a memory 503. The memory 503 may store a captured image of surroundings of a vehicle.

The processor 501 may estimate initial position information of the vehicle based on one or more sets of sensed motion information of the vehicle that are obtained from one or more sensors.

The processor 501 may calculate search position information of one or more objects included in the image of the surroundings of the vehicle based on the estimated initial position information.

The processor 501 may evaluate a final reliability of each of the objects based on the initial position information and the search position information. Using a preprocessor, the processor 501 may output a feature vector indicating an initial reliability of each of the objects included in a plurality of frame images included in a current frame block of the image of the surroundings of the vehicle. Using a state classifier, the processor 501 may output a classification vector indicating the final reliability of each of the objects based on the feature vector corresponding to the current frame block and a feature vector corresponding to a previous frame block. The processor 501 may classify state information of the search position information of each of the objects based on the classification vector for each of the objects.

The processor 501 may obtain a filter adaptation parameter corresponding to a weight of the search position information based on the final reliability. In an example, the processor 501 may determine a filter adaptation parameter based on the state information of the search position information of each of the objects. In another example, the processor 501 may output the filter adaptation parameter by inputting, to a parameter determining network, the classification vector indicating the final reliability of each of the objects. In this example, the parameter determining network may be trained in advance based on a training image including one or more objects and on true position information.

The processor 501 may estimate final position information of the vehicle based on the initial position information, the search position information, and the filter adaptation parameter. The processor 501 may estimate the final position information based on the initial position information, the search position information, and the filter adaptation parameter, using a Kalman filter. Further details regarding the processor 501 is provided below.

Figure 6:
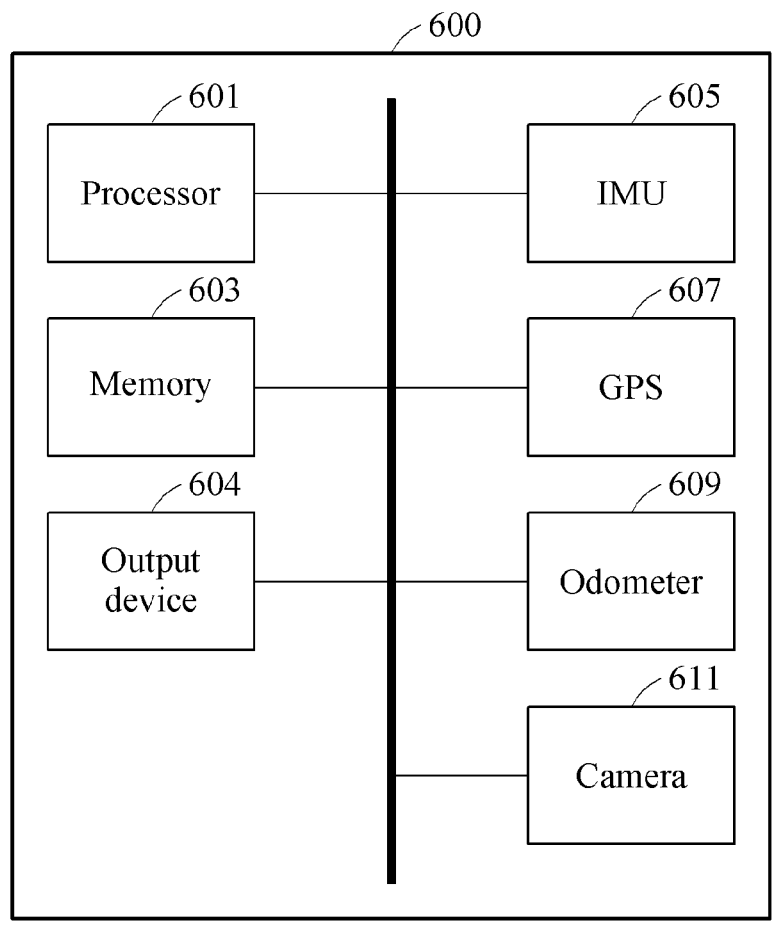
FIG. 6 illustrates an example of a configuration of a vehicle operating based on a position information estimating method.

FIG. 6 illustrates an example of a configuration of a vehicle operating based on a position information estimating method that is performed by position information estimating apparatus 600.

Referring to FIG. 6, a vehicle includes one or more sensors, at least one processor 601, a memory 603 configured to store a captured image of surroundings of the vehicle, and an output device 604. The sensors may output one or more sets of sensed motion information of the vehicle. Although the sensors are illustrated as including an IMU 605, a GPS 607, a vehicle odometer 609, and a camera 611, examples of the sensors are not limited thereto.

The processor 601 may estimate initial position information of the vehicle based on the sensed motion information. The processor 601 may calculate search position information of one or more objects included in the image of the surroundings of the vehicle based on the estimated initial position information. The processor 601 may evaluate a final reliability of each of the objects based on the initial position information and the search position information. The processor 601 may obtain a filter adaptation parameter corresponding to a weight of the search position information based on the final reliability. The processor 601 may estimate final position information of the vehicle based on the initial position information, the search position information, and the filter adaptation parameter. Further details regarding the processor 601 is provided below.

The output device 604 may provide an output for the final position information of the vehicle detected by the position information estimating apparatus 600 through a visual scheme, an auditory scheme, or a tactile scheme. In an example, the output device 604 provides the final position information of the vehicle detected by the position information estimating apparatus 600 to an advanced driver-assistance systems (ADAS) or other automated or assisted driving apparatus.

The output device 604 may include, for example, a display. In an example, the output device 604 is a physical structure that includes one or more hardware components that provide the ability to render a user interface, render a display, and/or receive user input. The output device 604 is not limited to the example described above, and any other displays, such as, for example, computer monitor, display of an advanced driver-assistance systems (ADAS), and eye glass display (EGD) that are operatively connected to the position information estimating apparatus 600 may be used without departing from the spirit and scope of the illustrative examples described. In an example, the output device 604 is a physical structure that includes one or more hardware components that provide the ability to render a user interface, render a display, output information, and/or receive user input. In an example, the output device 604 may receive a user input from a user. The output device 604 may detect an input from, for example, a keyboard, a mouse, a touch screen, a microphone, a motion detector, or a user, and may include any other device configured to transfer the detected input to the processor 601.

The position information estimating apparatus, INS operator 311, initial position information estimator 312, final position information estimator 316, reliability evaluator 314, filter adapter 315, object searcher 313, and other apparatuses, devices, units, modules, and components described herein with respect to FIGS. 1, 3, 5, and 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the position information estimating method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A position information estimating method to be performed by a processor, comprising:
    estimating initial position information of a vehicle based on motion information of the vehicle that is obtained from one or more sensors;
    calculating search position information of one or more objects included in an image of surroundings of the vehicle based on the initial position information;
    evaluating a final reliability of each of the one or more objects based on the initial position information and the search position information;
    obtaining a filter adaptation parameter corresponding to a weight of the search position information based on the final reliability; and
    estimating final position information of the vehicle based on the initial position information, the search position information, and the filter adaptation parameter.

2. The position information estimating method of claim 1, wherein the evaluating of the final reliability comprises:
    evaluating an initial reliability of each of the one or more objects included in frame images of a current frame block of the image of the surroundings of the vehicle; and
    evaluating the final reliability based on the initial reliability corresponding to the current frame block and an initial reliability corresponding to a previous frame block.

3. The position information estimating method of claim 2, wherein the evaluating of the final reliability comprises:
    outputting a feature vector corresponding to the initial reliability of each of the one or more objects included in the current frame block, using a preprocessor; and
    outputting a classification vector indicating the final reliability of each of the one or more objects based on the feature vector corresponding to the current frame block and a feature vector corresponding to the previous frame block, using a state classifier.

4. The position information estimating method of claim 3, wherein the evaluating of the final reliability further comprises:
    classifying state information of the search position information of each of the one or more objects based on the classification vector of each of the objects.

5. The position information estimating method of claim 3, wherein the preprocessor comprises a convolutional neural network (CNN), and the state classifier comprises a recurrent neural network (RNN) or a long short-term memory (LSTM) model.

6. The position information estimating method of claim 2, further comprising:
    excluding an object of the one or more objects having the initial reliability less than a first threshold value or an object of the one or more objects having the final reliability less than a second threshold value.

7. The position information estimating method of claim 1, wherein the obtaining of the filter adaptation parameter comprises:
    determining a filter adaptation parameter based on the final reliability.

8. The position information estimating method of claim 7, wherein the obtaining of the filter adaptation parameter comprises:
    determining a filter adaptation parameter based on state information of the search position information of each of the objects.

9. The position information estimating method of claim 1, wherein the obtaining of the filter adaptation parameter comprises:
    outputting the filter adaptation parameter based on the final reliability, using a parameter determining network,
    wherein the parameter determining network is trained in advance based on a training image including one or more objects and on ground truth position information.

10. The position information estimating method of claim 9, wherein the obtaining of the filter adaptation parameter comprises:
    outputting the filter adaptation parameter by inputting, to the parameter determining network, a classification vector indicating the final reliability of each of the one or more objects.

11. The position information estimating method of claim 1, wherein the estimating of the final position information comprises:
    estimating the final position information based on the initial position information, the search position information, and the filter adaptation parameter, using a Kalman filter.

12. The position information estimating method of claim 1, wherein the calculating of the search position information of the one or more objects comprises using a pre-trained neural network for each object type to output the search position information of the one or more objects.

13. The position information estimating method of claim 1, wherein the filter adaptation parameter is configured to adjust a covariance matrix of the Kalman filter.

14. The position information estimating method of claim 1, wherein the initial position information of the vehicle comprises one or more of a position, a velocity, and a pose of the vehicle.

15. A non-transitory computer-readable storage medium storing instructions that, when executed by a processor, cause the processor to perform the position information estimating method of claim 1.

16. A position information estimating apparatus, comprising:
    a memory configured to store an image of surroundings of a vehicle; and
    a processor configured to
        estimate initial position information of the vehicle based on motion information obtained from one or more sensors;

calculate search position information of one or more objects included in the image of the surroundings of the vehicle based on the initial position information;

evaluate a final reliability of each of the one or more objects based on the initial position information and the search position information;

obtain a filter adaptation parameter corresponding to a weight of the search position information based on the final reliability; and estimate final position information of the vehicle based on the initial position information, the search position information, and the filter adaptation parameter.

17. The position information estimating apparatus of claim 16, wherein the processor is further configured to:

output a feature vector corresponding to an initial reliability of each of the one or more objects included in frame images of a current frame block of the image of the surroundings of the vehicle, using a preprocessor; and output a classification vector indicating the final reliability of each of the one or more objects based on the feature vector corresponding to the current frame block and a feature vector corresponding to a previous frame block, using a state classifier.

18. The position information estimating apparatus of claim 17, wherein the processor is further configured to:

classify state information of the search position information of each of the one or more objects based on the classification vector of each of the objects.

19. The position information estimating apparatus of claim 16, wherein the processor is further configured to:

determine a filter adaptation parameter based on state information of the search position information of each of the objects.

20. The position information estimating apparatus of claim 16, wherein the processor is further configured to:

output the filter adaptation parameter by inputting, to a parameter determining network, a classification vector indicating the final reliability of each of the objects, wherein the parameter determining network is trained in advance based on a training image including one or more objects and on ground truth position information.

21. The position information estimating apparatus of claim 16, wherein the processor is further configured to:

estimate the final position information based on the initial position information, the search position information, and the filter adaptation parameter, using a Kalman filter.

22. A vehicle comprising:

a sensor configured to output sensed motion information of the vehicle;

a memory configured to store an image of surroundings of the vehicle; and a processor configured to estimate initial position information of the vehicle based on the sensed motion information;

calculate search position information of one or more objects included in the image of the surroundings of the vehicle based on the initial position information;

evaluate a final reliability of each of the one or more objects based on the initial position information and the search position information;

obtain a filter adaptation parameter corresponding to a weight of the search position information based on the final reliability; and estimate final position information of the vehicle based on the initial position information, the search position information, and the filter adaptation parameter.

* * * * *